Figure 1:
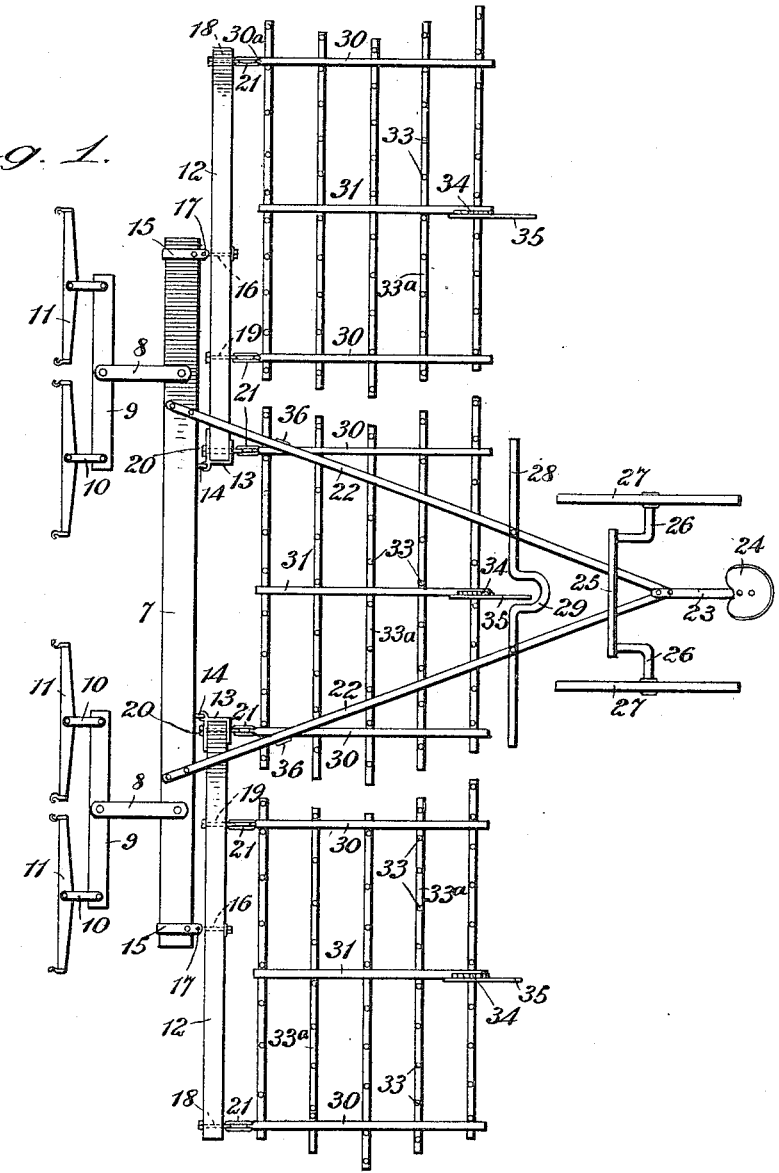

R. L. BOEHNE.
HARROW.
APPLICATION FILED JULY 6, 1914.

1,127,169.

Patented Feb. 2, 1915.

3 SHEETS—SHEET 1.

WITNESSES

INVENTOR
Ralph L. Boehne
BY
ATTORNEYS

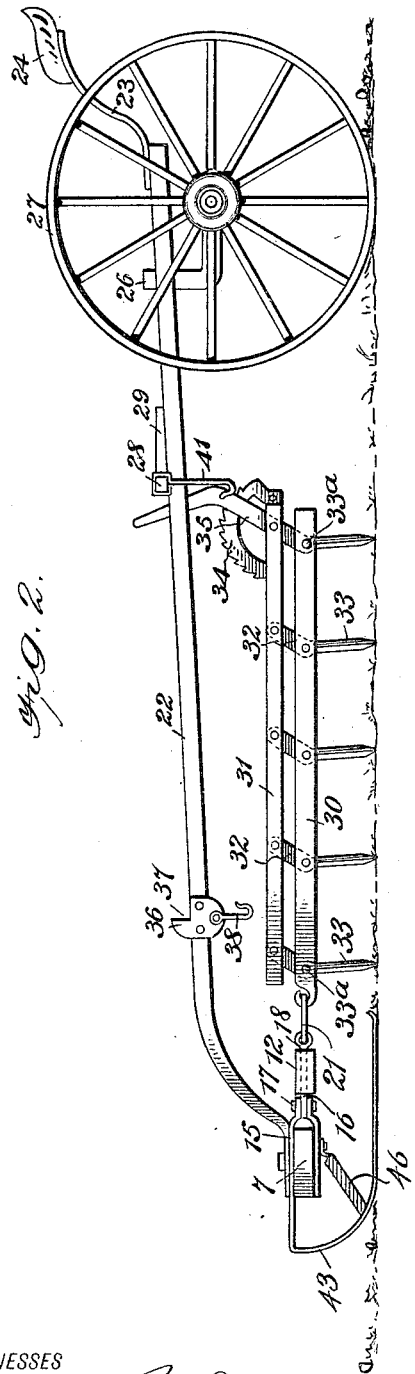
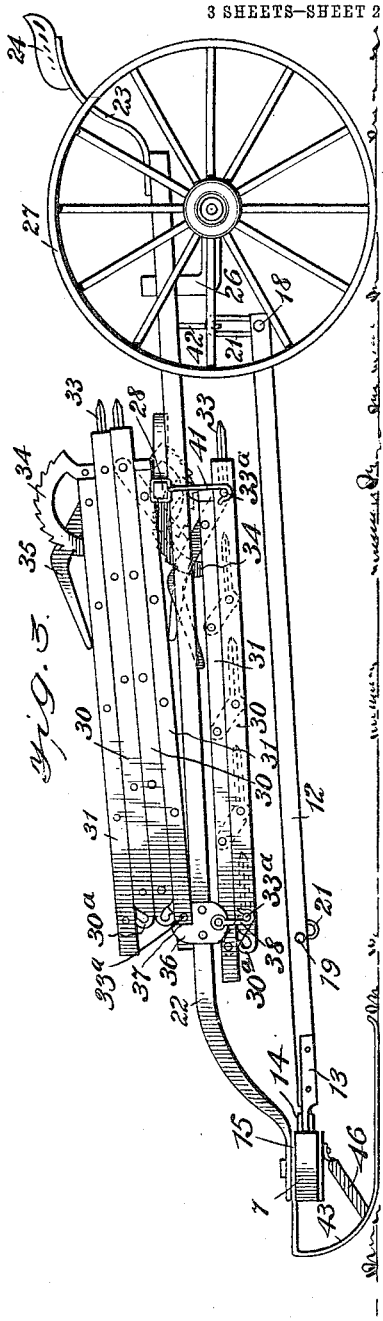

R. L. BOEHNE.
HARROW.
APPLICATION FILED JULY 6, 1914.
1,127,169.
Patented Feb. 2, 1915.
3 SHEETS—SHEET 3.
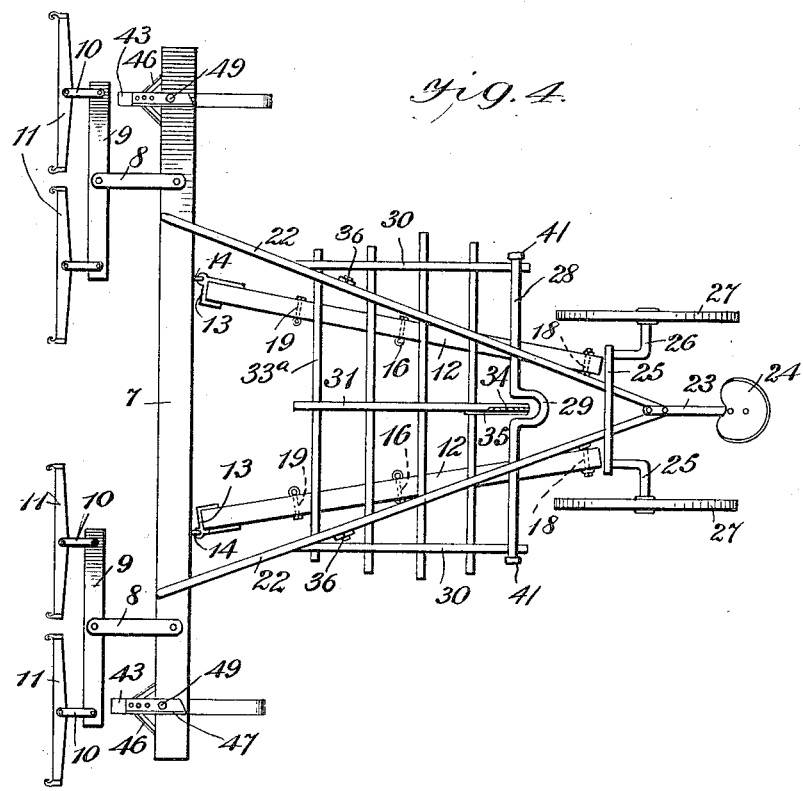
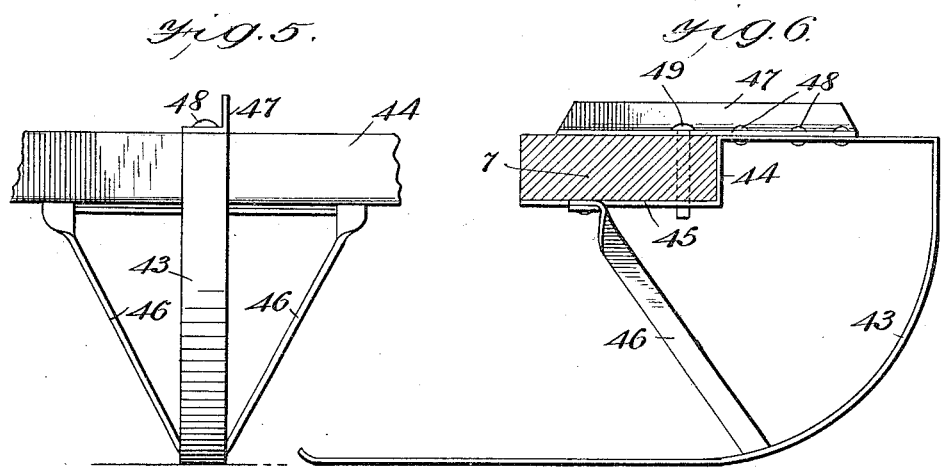
WITNESSES
INVENTOR
Ralph L. Boehne
BY
ATTORNEYS

UNITED STATES PATENT OFFICE.

RALPH LYMAN BOEHNE, OF DONIPHAN TOWNSHIP, HALL COUNTY, NEBRASKA.

HARROW.

1,127,169.

Specification of Letters Patent.

Patented Feb. 2, 1915.

Application filed July 6, 1914. Serial No. 849,117.

*To all whom it may concern:*

Be it known that I, RALPH L. BOEHNE, a citizen of the United States, residing in the township of Doniphan, in the county of Hall and State of Nebraska, have invented certain new and useful Improvements in Harrows, of which the following is a specification.

My invention relates to harrows, and more particularly to means for taking apart the different sections of the harrow and reassembling the same in compact form so that the harrow as a whole is in suitable condition to be conveyed from place to place.

More particularly stated, I produce a harrow having a knockdown construction, including a frame and a number of harrow sections, so arranged that the sections, or some of them, may be detached from the frame, and again connected therewith so as to occupy changed positions relatively to the same.

Reference is made to the accompanying drawings forming a part of this specification, and in which like letters indicate like parts.

Figure 1 is a plan view of the harrow, showing it as ready for action upon soil. Fig. 2 is a side elevation of the same. Fig. 3 shows the harrow with its parts dismantled and packed together, ready for transportation. Fig. 4 is a plan view of the harrow arranged as indicated in Fig. 3. Fig. 5 is a detail view, showing in fragmentary front elevation one of the runners for supporting the evener beam, when the harrow is ready for transportation. Fig. 6 is a section through the evener beam, showing one of the runners.

The evener beam of the harrow is shown at 7, and connected with it are two clevis links 8 which support double trees 9. The latter carry clevises 10, and connected with these clevises are swingletrees 11. At 12 are two evener bars provided at their inner ends with corner eyes 13, which engage two stationary eyes 14 carried by the evener beam 7. Mounted upon the ends of this evener beam are cuffs 15 which carry eye bolts 16, the latter being connected to the cuffs by pins 17. The evener bars 12 are provided with eye bolts 18, 19, 20, and connected with these eye bolts are links 21. A pair of cart beams are shown at 22, and together have substantially a V-form. Mounted upon these cart beams is a seat spring 23 carrying a driver's seat 24. An axle 25 is provided with a pair of L-shaped portions 26, and mounted upon the latter are the ground wheels 27. A brace 28 is secured upon the cart beams, and is provided, adjacent its middle, with a U-bend 29. At 30, 31 are the harrow bars connected by links 32, as indicated in Fig. 2. The harrow teeth appear at 33, and are carried by tooth bars 33ª. Connected with the harrow bars 30, 31 are hand levers 35, and mounted upon the harrow bars 31 are sectors 34 which coact with the hand levers 35 for the purpose of enabling the operator to control the inclination of the harrow teeth 33, this being done in the usual or any desired manner. Mounted rigidly upon the cart beams 22 are two brackets 36, each provided with a shoulder 37. Depending from each bracket 36 and the brace 28 are hooks 38 and 41, respectively, which are adapted to support the harrow below the cart beams, as indicated in Fig. 3. The hook 41 is secured to the brace 28. By thus suspending one harrow section below the cart beams, the remaining two sets of harrow bars 30 and tooth bars 31 may be laid upon the cart beams 22, as indicated in Fig. 3. It will be noted that the shoulder 27 engages the adjacent end portion of one of the tooth bars 33ª, and thus prevents the mechanism resting upon the cart beams from creeping forward.

While the parts remain in the positions indicated in Fig. 1, the evener bars are parallel with the evener beam 7. When, however, the harrow is to be arranged for transportation, the pins 17 are removed, so as to disconnect the eye bolts 16 from the cuffs 15. The evener bars are next swung around, upon the stationary eyes 14 as centers, until the outer or free ends of the evener bars are brought into the positions indicated in Fig. 4. They are then secured by hooks 42, engaging the links 21 carried at the outer or free ends of the evener bars, as will be understood from Fig. 3. In this manner the evener bars 12 are disposed of in such manner that they extend practically backward toward the driver's seat, and are therefore out of the way.

At 43 are shown two runners which may be detachably connected to the evener beam 7, and are so connected whenever the harrow is to be arranged for transportation, as indicated more particularly in Fig. 3. Each runner 43 is provided with portions 44, 45 which engage and fit partially around the evener beam 7. Braces 46 engage the runners 43 and the evener beam 7 so as to hold these parts in proper relative position. Strengthening irons 47 engage the evener beam 7 and are connected with the runners 43 by rivets 48. Connecting pins 49 extend through the strengthening irons 47 and through the evener beam 7 as well as through the portions 45 of the runners. By withdrawing the pins 49, the runners may be detached from the evener beam 7.

The runners are preferably not employed while the harrow is used for operating upon the soil, the purpose of the runners being to enable the mechanism to be readily transported as indicated in Fig. 3. While in this particular instance I show runners as used for supporting the front portion of the harrow when the parts are ready for transportation, it should be understood that the front portions of the harrow may be supported in any other manner suitable for the purpose indicated.

I do not limit myself to the precise mechanism shown, as variations may be made therein without departing from the spirit of my invention.

Having thus described my invention, what I claim as new and desire to secure by Letters Patent is as follows:

1. In a harrow, the combination of an evener beam, supporting mechanism detachably connected therewith for temporarily supporting said evener beam as the latter is moved over the ground, cart beams connected with said evener beam, mechanism carried by said cart beams for supporting a harrow section suspended therefrom, and means for securing harrow sections upon the top of said cart beams.

2. In a harrow, the combination of an evener beam, supporting members connected with said evener beam and adapted to engage the ground for supporting said evener beam as the harrow is transported from place to place over the ground, cart beams connected with said evener beam and having together a proximate V-form, a driver's seat connected with said cart beams and supported thereby, an axle connected with said cart beams, a pair of wheels mounted upon said axle for engaging the ground and thus supporting said cart beams, a pair of evener bars pivotally connected with said evener beam and adapted to be swung rearwardly from the same, connections for securing said evener bars to said cart beams when said evener bars are thus swung rearwardly, mechanism carried by said cart beams for supporting a harrow section located below said cart beams, and means for securing harrow sections upon the top of said cart beams.

3. In a harrow, the combination of an evener beam, draft mechanism connected with said evener beam, a pair of evener bars pivotally connected to said evener beam and adapted to swing relatively to the same, mechanism for holding said evener bars rigid relatively to said evener beam and substantially parallel therewith when the harrow is used for purpose of operating upon the soil, a pair of cart beams connected with said evener beam, connections for supporting said evener bars from said cart beams when the harrow is to be transported, an axle connected with said cart beams, wheels mounted upon said axle and engaging the ground for supporting said cart beams, means for suspending a harrow section below said cart beams, means for holding a plurality of harrow sections resting upon said cart beams, and supporting mechanism carried by said evener beam for supporting the adjacent portions of the harrow.

4. In a harrow, the combination of a frame, an axle connected therewith, a pair of wheels mounted upon said axle for engaging the ground and partially supporting said frame, an evener bar connected with said frame, a plurality of harrow sections to be detachably connected with said evener bar, means for connecting said harrow sections with said frame when said harrow sections are disconnected from said evener bar, and mechanism detachably connected with said evener bar for temporarily supporting said evener bar adjacent the portion of said frame.

5. In a harrow, the combination of an evener beam, mechanism detachably connected with said evener beam for supporting the same from the ground, a pair of cart beams connected with said evener beam, a seat supported by said cart beams, a pair of wheels for engaging the ground and partially supporting said cart beams and said seat, a harrow section, means for suspending said harrow section beneath said cart beams, and a plurality of harrow sections to be rested upon said cart beams.

6. In a harrow, a frame, means for supporting the frame above the ground, a harrow carrying bar hinged to the frame to swing rearwardly in the direction of the line of draft or at right angles thereto, means for detachably securing the bar to the frame to hold it at right angles to the line of draft, and means for detachably securing the outer end of the said bar to the frame when swung rearwardly.

7. In a harrow, a frame having a beam at its front to which the draft is applied, means at front and rear for supporting the frame above the ground, a harrow carrying bar hinged to the frame beam to swing parallel with or rearwardly at an angle to said frame beam and below the same, means for detachably connecting the bar with the frame beam to hold it parallel therewith, and means for detachably connecting it with the frame when swung rearwardly.

In testimony whereof I have signed my name to this specification in the presence of two subscribing witnesses.

RALPH LYMAN BOEHNE.

Witnesses:
F. J. SCHAUFELBERGER,
H. KANF.